Figure 6:
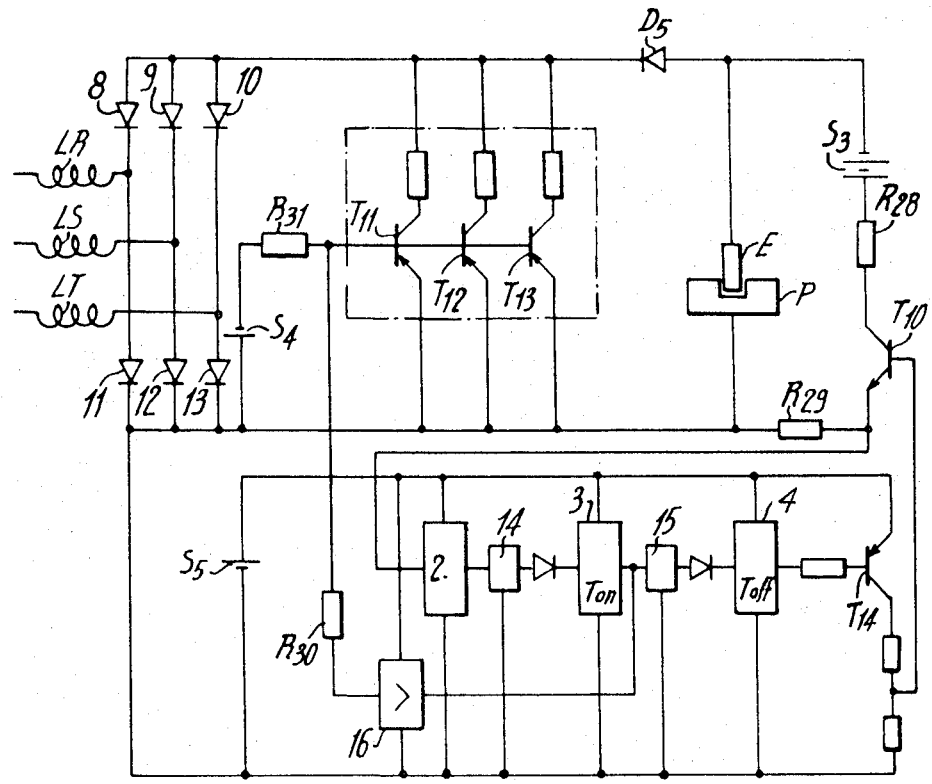

United States Patent [19]
Pfau

[11] 3,916,138
[45] Oct. 28, 1975

[54] APPARATUS FOR MACHINING THROUGH VARYING-FREQUENCY CONSTANT-DURATION PULSE-CONTROLLED ELECTRIC DISCHARGES

[75] Inventor: Jean Pfau, Geneva, Switzerland

[73] Assignee: Ateliers Des Charmilles, S.A., Geneva, Switzerland

[22] Filed: Mar. 3, 1970

[21] Appl. No.: 18,803

Related U.S. Application Data

[62] Division of Ser. No. 423,237, Jan. 4, 1965.

[30] Foreign Application Priority Data
Feb. 25, 1964 Switzerland.................... 2295/64

[52] U.S. Cl............................... 219/69 C; 219/69 P
[51] Int. Cl.² .......................................... B23P 1/08
[58] Field of Search....................... 219/69 C, 69 P

[56] References Cited
UNITED STATES PATENTS
3,259,795  7/1966  Schierholt..................... 219/69 C Primary Examiner—Bruce A. Reynolds
Attorney, Agent, or Firm—Hauke, Patalidis & Dumont

[57] ABSTRACT

Apparatus used for electric discharge machining, which senses the commencement of each discharge across the gap between the electrode and workpiece and cuts off each discharge after a predetermined time interval.

24 Claims, 12 Drawing Figures

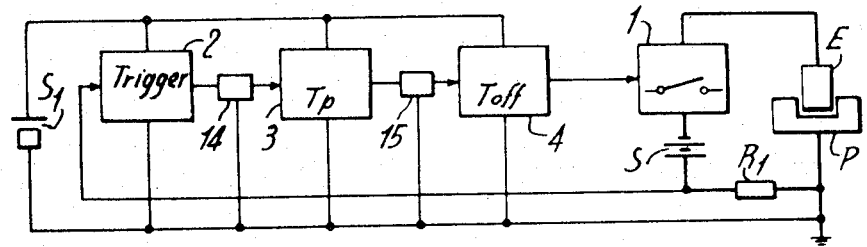
FIG. 2
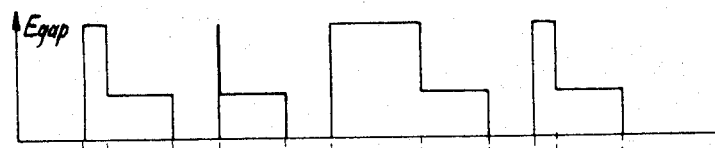
FIG. 3a
FIG. 3b
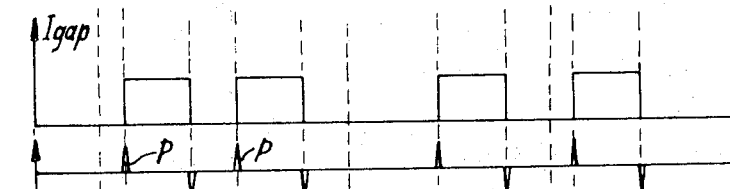
FIG. 3c
FIG. 3d
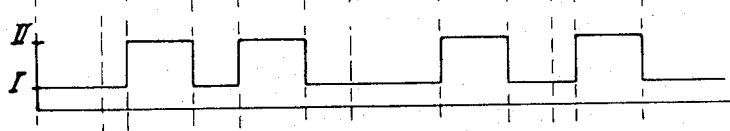
FIG. 3e
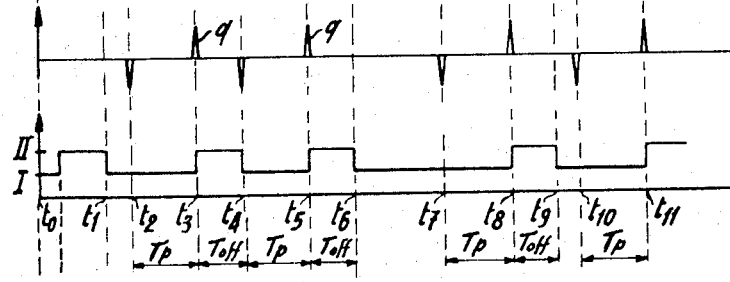
FIG. 3f

APPARATUS FOR MACHINING THROUGH VARYING-FREQUENCY CONSTANT-DURATION PULSE-CONTROLLED ELECTRIC DISCHARGES

This application is a division of my copending application Ser. No. 423,237, filed Jan. 4, 1965.

Various methods for machining through intermittent electric discharges between a part of conductive material to be machined and an electrode have already been proposed.

The simplest apparatus for the execution of such methods are those machining apparatus of the relaxation type, wherein a condenser connected in parallel between the part to be machined and the electrode is charged from source and then unloaded into the machining gap each time its voltage reaches a value sufficient for the jumping of a spark between the electrode and said part.

Apparatus of such a type have such drawbacks that in spite of their great simplicity, they are used less and less and the operator always prefer more improved apparatus. One of the chief drawbacks of the apparatus referred to resides in their low machining speed which is limited for each predetermined surface condition by the production of short circuits as soon as it is attempted to increase the frequency by increasing the current charging the condenser.

To remove this drawback, it has already been proposed to control the intermittent discharges by applying periodically across the electrode and the part to be machined a difference in potential adapted to make a spark jump and by opening periodically the discharge circuit.

According to this method, the application of said difference in potential is performed at a predetermined frequency and during a predetermined duration so that the current pulses to be obtained should apparently all be similar. Now, experience shows that the intermittent discharges are not equal as to grade and duration and this is asoribable to the fact that the discharges are not obtained instantaneously as soon as the necessary voltage is applied between the electrode and the part to be machined. There exists, as a matter of fact, an undefined delay which varies from one discharge to the next.

The average value of this delay depends on numerous parameters, chiefly on the voltage applied to the machining gap, on the distance separating the electrode from the part or work to be machined and on the energy of the discharge. This delay plays only a negligible part when the frequency of the machining pulses is reduced and, in principle, is reduced down to less than about 1 kilocycle. In contradistinction, if the machining is performed at a high frequency, chiefly for instance at tens of kilocycles, the delay may become comparable to the duration of a pulse.

Figure 1A:
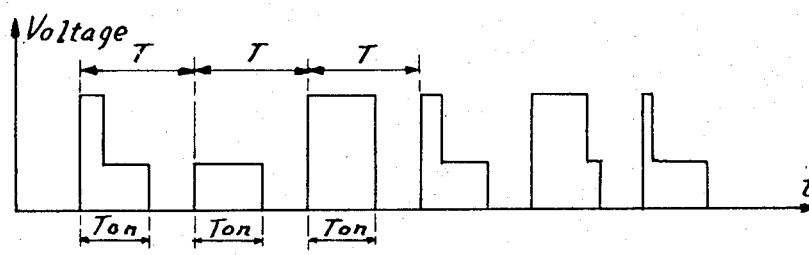
Figure 1B:
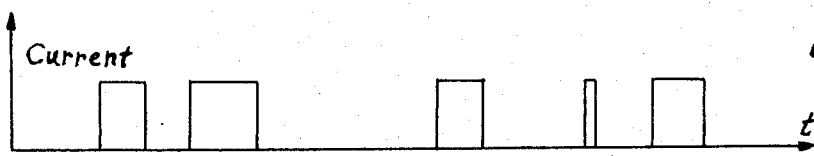

This is illustrated in accompanying FIGS. 1a and 1b.

FIG. 1a illustrates the voltage pulses applied between the part to be machined and the electrode, and FIG. 1b illustrates the current pulses which are discharged between the electrode and the part. The voltage pulses have always the same duration and are alway spaced equally. Their periodicity T is equal to the inverse of the frequency $f$; at the beginning of each pulse, the voltage is high, until commencement of the discharge at which time the voltage drops down to the value of the discharge voltage between the part and the electrode.

During the first pulse the delay reaches ⅓ of the duration of the pulse Ton, while during the second pulse this delay is equal to 0. For the third pulse, the delay is larger than the duration of the actual pulse, so that no discharge occurs. The fourth pulse is similar to the first one. As apparent from inspection of FIG. 1b, only the second current pulse shows the maximum possible duration Ton, the first and fourth pulse being shorter, while the third pulse is cut out. It should be noted that the frequency of the current pulses is lower than the frequency of the voltage pulses.

The actual duration of each machining pulse is reduced by the duration of the delay and since the latter varies irregularly for each pulse, the pulses do not shown a uniform duration. The discharges are constituted by a mixture of pulses of varying lengths and consequently of a variable energy as apparent from FIG. 1b. Since the amount of material removed at each discharge varies as a function of the energy of the discharge, the machining is obtained by a succession of craters of which the size is not constant. The grade of machining is obviously defined by the size of the larger craters.

For a machining of a predetermined grade, it will be readily understood that all the discharges, of which the energy is lower than the maximum possible energy which may be carried by each discharge, correspond to a loss of efficiency. Furthermore, when the duration of the delay is comparable to or larger than the duration of a pulse, certain voltage pulses are not accompanied by any discharge current as in the case of the third pulse illustrated in FIG. 1a. This results in a considerable reduction of the average machining current with reference to that which might be obtained if the duration of the delay were reduced to 0. This reduction of the average current leads obviously to a corresponding reduction of the speed of machining.

An object of the invention is to obtain a maximum average machining current and consequently a maximum speed for a predetermined grade of the surface.

Another object of the present is to provide a method for machining through intermittent electric discharges jumping between a part of conductive material to be machined and an electrode, according to which method controlled pulses, the voltage of which is higher than the discharge voltage, are formed between the part to be machined and the electrode, and produce, after an undefined delay, a discharge between said part and the electrode, and the duration of each pulse increases as a function of the duration of the delay of the corresponding discharge.

The present invention has another object in that apparatus for machining a part by electrical discharge includes a generator of intermittent discharges, means for controlling the discharges, a circuit detecting the commencement of each discharge and means controlled by the circuit and acting on the means controlling the discharges, so as to end each discharge at a suitable moment.

In the accompanying drawings given by way of example.

FIGS. 1a and 1b are explanatory graphs as referred to hereinabove.

Figure 4:
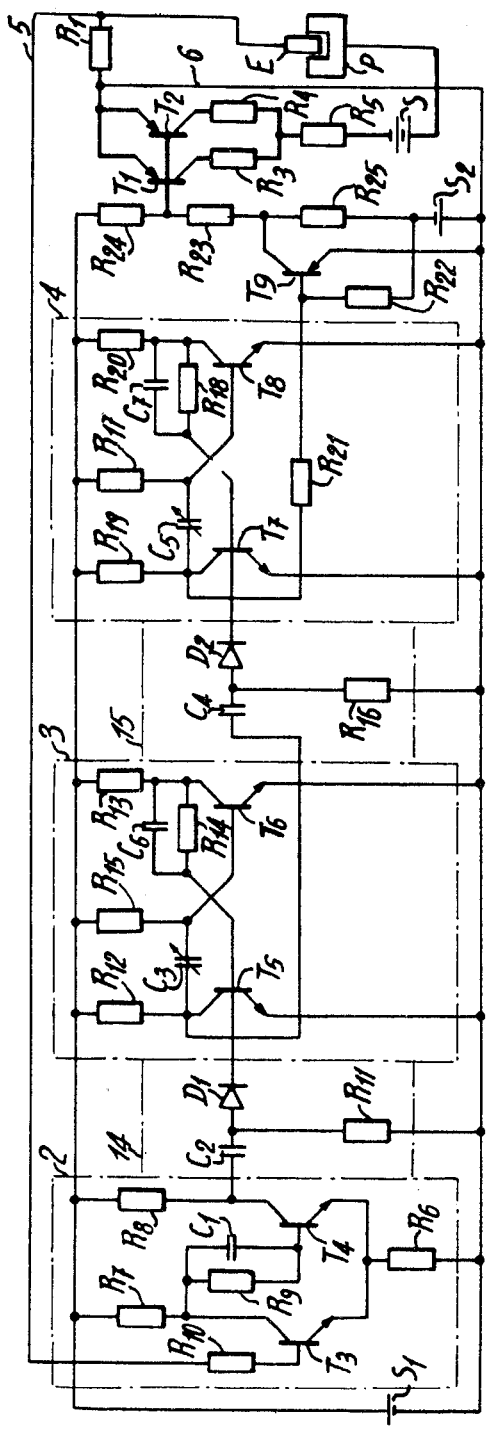
Figure 5:
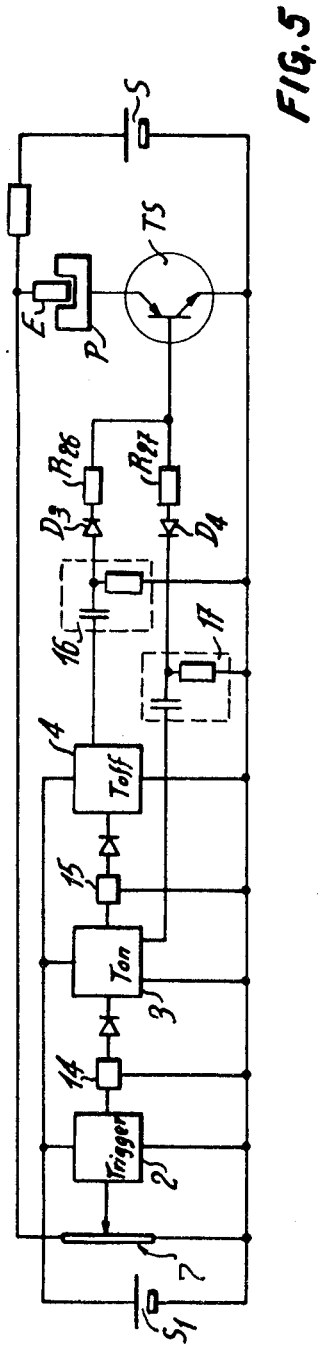

FIGS. 2 to 6 illustrate diagrammatically and by way of example several embodiments of apparatus for executing the improved method disclosed hereinabove. More specifically, FIG. 2 is a diagrammatic showing of one embodiment. FIGS. 3a to 3f are explanatory graphs illustrating the operation of the embodiment of FIG. 2. FIG. 4 is a circuit diagram of an embodiment of the present invention. FIGS. 5 and 6 show two further embodiments of the present invention.

Turning first to FIG. 2, the apparatus includes a supply of current S adapted to supply the energy required for the discharges to be produced between an electrode E and the part to be machined P. The supply S is connected with the electrode E through a current making and breaking element 1 and with the part P through a resistance $R_1$.

Resistance $R_1$ detects the passage of current during the discharge between the electrode E and the part P as provided by the voltage drop appearing across the terminals of resistance $R_1$ when the discharge current passes through it. The voltage across the terminals of the resistance $R_1$ is applied to a Schmitt trigger 2, i.e. a binary circuit similar to a flip-flop circuit, which rocks into one position when the input signal is larger than a predetermined value and which returns to its former position only when the input signal has been lowered to a value substantially lower than that which produced its first rocking movement. There is thus always obtained a very sudden output signal, even when the value of the input signal varies slowly. The Schmitt trigger 2 controls in its turn a monostable multivibrator 3 through the agency of a differentiating circuit 14 supplying short pulses during the rocking of the Schmitt trigger. The output of the multivibrator 3 is connected in its turn with the differentiating circuit 15 which controls a second multivibrator 4 which is monostable. The multivibrator 4 controls the operation of the current breaking and making element 1, or switch element, which is advantageously constituted by at least one semi-conductive element, the conduction of which is controlled.

The Schmitt trigger 2 and the multivibrators 3 and 4 are fed by a supply $S_1$. The operation of the apparatus FIG. 2 will now be explained with, reference to FIGS. 3a to 3f.

FIG. 3a illustrates the voltage E between the electrode and the part as a function of time and during a short period of operation corresponding to four discharges. At the time $t1$, the current breaking and making element 1 is closed, so that the voltage of the supply S is applied across the electrode E and the part P. The discharge is however not obtained instantaneously, but only after a delay lasting from $t1$ to $t2$. the discharge is produced between $t2$ and $t3$ during a predetermined duration $T_p$ and it is interrupted at the moment $t3$ by the current making and breaking element 1 the control of which will be described hereinafter. The duration of the interruption designated by Toff is also a predetermined value.

At the time $t4$, the voltage is again applied across the electrode and the part and the discharge is obtained immediately, the delay being assumed how to be practically equal to 0. The discharge is interrupted at the time $t5$.

It will be assumed that the following discharge is only established after a comparatively long delay extending from $t6$ to $t7$, the delay being longer than the desired duration of a discharge. The discharge current passes only at the time $t7$ and said discharge is interrupted at the time $t8$. The following discharge has the same shape as the first discharge, the voltage being applied as early as $t9$ and the current passing between $t10$ and $t11$.

FIG. 3b shows the passage of the discharge current 1 for each case illustrated in FIG. 3a and it is apparent that each discharge is performed under constant current conditions and lasts for a predetermined duration. Thus, all the discharges are equal as concerns their energy. The curve illustrated in FIG. 3b corresponds also to the input voltage which is applied to the Schmitt trigger 2. The output signal of the latter is similar to the input signal, but it is shaped; in other words, the output signal passes suddenly from a stationary level to another stationary level even when the input signal is constituted by voltage pulses of a variable level.

FIG. 3c illustrates the voltage pulses at the output of the differentiating circuit 14 fed by the Schmitt trigger 2.

FIG. 3d illustrates the operation of the monostable multivibrator 3 which passes from its stable condition I to its non-stable condition II each time it receives a positive pulse illustrated in FIG. 3c showing the establishment of the discharge current. Since multivibrator 3 is monostable, it returns automatically into its condition I a predetermined time Tp after it has been brought into its non-stable condition II. The time delay Tp is selected so as to be equal to the desired duration of the discharge for predetermined machining conditions. It may be readily modified through a change in the value of a condenser capacity and/or of a resistance in the multivibrator 3.

FIG. 3e illustrates the pulses, obtained at the output of the differentiating circuit 15, the polarity of which is predetermined during the rocking of the multivibrator 3 into one of its conditions and of the opposite polarity when it rocks into its other condition. These pulses are applied to the monostable multivibrator 4 to drive it into its non-stable condition each time it receives a pulse corresponding to the end of a discharge between the electrode and the part to be machined.

FIG. 3f shows that the multivibrator 4 passes from its stable condition I to its non-stable condition II each time the differentiating circuit 15 supplies a pulse of a predetermined polarity. Since the multivibrator 4 is monostable, it returns into its position I a predetermined time after it has rocked into its position II. The time delay is selected so as to be equal to the desired duration of opening Toff of the discharge circuit after each discharge. The output signal of the multivibrator 4 serves for controlling the current breaking and making element 1, so as to make the latter conductive when the multivibrator 4 is in its condition I and to produce the non-conductive condition of the element 1 when the multivibrator 4 is in its condition II. At the time $t_o$ it will be assumed that the multivibrator 4 has been brought into its condition II, so that it rocks into is condition I at the time $t1$ and closes the element 1. The voltage of the supply S is then applied between the electrode E and the part P and at the moment $t2$ when the discharge current is established, the variations in voltage across the terminals of $R_1$ fed to the trigger 2 lead to the formation of a voltage pulse $p$ at the output of the differentiating circuit 14. These pulses are illustrated in FIG. 3c. The pulse $p$ is applied to the input of the multivibrator 3 and causes it to rock at the time $t2$. The duration required for the automatic rocking back of multivibrator 3 defines the duration Tp of a discharge between E and P since, when the multivibrator 3 returns to its condition I, there is produced through the differential circuit 15 a pulse $q$ which brings the multivibrator 4 into its condition II, this producing simultaneously the opening of the discharge circuit through the element 1. The duration of opening of element 1 is defined by the duration Toff required for the multivibrator 4 to return into its stable condition. Thus, discharges are obtained which have identical durations Tp as appears from inspection of FIG. 3b whereas the time Toff separating the end of one discharge form the moment as which the voltage adapted to produce the next voltage is applied is always the same, as apparent from inspection of FIG. 3a.

FIG. 4 is a circuit diagram of an embodiment corresponding to FIG. 2. On the right-hand side of FIG. 4 is shown the supply S, the part to be machined P, the electrode E and the resistance $R_1$ which connected between the electrode E and the current making and breaking element 1, which is constituted by a battery of transistors in parallel, of which only two have been illustrated and are designated by the references T1 and T2. The collectors of these two transistors are each in series with a resistance R3 or R4 of a reduced value, said resistances R3 and R4 being adapted to equilibrate the current in the usual case where the characteristics of the transistors are not perfectly identical. The discharge circuit includes also a resistance R5 adapted to limit and define the amplitude of the pulse formed by the discharge current, resistance R5 being advantageously adjustable.

The voltage appearing across the terminals of the resistance R1 when it is fed by the discharge current, is fed by the leads 5 and 6 to the input of the Schmitt trigger 2 which includes in the conventional manner two transistors T3 and T4. Transistors T3 and T4 are of the npn type in this case and they are fed by a supply of current $S_1$. Their emitters are interconnected and are connected with a terminal of said supply $S_1$ through a resistance R6. Their collectors are connected with the other terminal of the supply $S_1$ through a resistance R7 and R8. The collector of the transistor T3 is connected with the base of T4 through a resistance R9 bridged by a condenser C1. The signal tapped off the resistance R1 is applied to the base of T3 through a resistance in $R_{10}$.

The different resistances of the Schmitt trigger 2 are given values such that the transistor T4 operates while T3 is locked as long as the signal applied to the base of T3 remains lower than a predetermined value, example +5V. If the signal rises above 5V, the transistor T3 becomes conductive and the drop in voltage appearing on its collector produces a locking of the transistor T4. This operative condition remains unaltered as long as the input signal does not drop below a predetermined value, for example 3V. Thus, even in the case where the discharge current is subjected to substantial modifications in an untimely manner, for instance as a consequence of an erroneous adjustment of the spacing between the electrode and the part, there is obtained at the output of the Schmitt trigger a clear signal which does not reproduce the undesired modifications.

The collector of the transistor T4 is connected with a network supplying an electric signal at the output which corresponds to the derivative of the input signal. This network is constituted by a condenser C2 and a resistance $R_{11}$, the connection between these condenser and resistance supplying a positive pulse at the moment of the locking of the transistor T4 and a negative pulse at the moment at which the latter becomes again conductive. A diode D1 passes only positive pulses to the input of the monostable multivibrator 3 which includes two transistors T5 and T6 of the npn type, of which transistors the emitters are connected with the negative pole of the supply S1. The collectors of T5 and T6 are connected through resistances $R_{12}$ and $R_{13}$ with the positive pole of the supply S1. The collector of T6 is furthermore connected through a resistance $R_{14}$ shunted by a condenser C6 to the base of the transistor T5 whereas the collector of T5 is connected with the base of T6 through an RC network constituted by a variable condenser C3 and a resistance $R_{15}$.

In the absence of a signal on its base, the transistor T5 is locked and the transistor T6 is conductive. When a positive pulse is applied to the base of T5, the transistor becomes conductive and locks the transistor T6 through a negative pulse transmitted through C3. The transistor T6 remains locked as long as the condenser C3 has not been discharged into the resistance $R_{15}$.

When the potential at the terminal of C3, which is connected with the base of T6, is no longer negative and becomes slightly positive as a consequence of the discharge of condenser C3, T6 becomes again conductive. The multivibrator 3 is thus in a stable condition and it can be shifted out of this condition for a predetermined period under the action of a positive pulse applied to the base of T5. Multivibrator 3 is therefore of a monostable type and the potential of the collector of the transistor T5 forms the output signal applied to a RC circuit of the same type as that connecting the Schmitt trigger with the multivibrator 3.

The R.C. circuit constituted by a condenser C4 and a resistance R16 controls the second monostable multivibrator 4 through positive pulses applied to the base of the transistor T7. The circuit of the multivibrator 4 is similar to that of the multivibrator 3 and the collector of T7 is connected with the base of the transistor T8 through a RC circuit including a condenser C5 and a resistance $R_{17}$. The collector of T8 is connected with the base of T7 through a resistance $R_{18}$ shunted by a condenser C7. The collectors of the transistors T7 and T8 are connected with the positive pole of supply $S_1$ through the resistance $R_{19}$ and R20, respectively.

Multivibrator 4 operates in the same manner as that which has just been described. The transistor T8 is normally conductive and it is brought into its non-conductive condition for a predetermined period each time a positive pulse is applied to the base of the transistor T7. Multivibrator 4 controls the circuit making and breaking element through an amplifier including a transistor T9 of the pnp type which is fed by a separate supply S2. The potential of the collector of the transistor T7 is applied to the base of T9 through a voltage divider including resistances R21 and R22. The potential of the collector of T9 is applied to the base of the transistors $T_1$ and $T_2$ by a voltage divider R23 and R24. The collector of T9 is connected with the negative terminal of S2 through a resistance R25. Through this arrangement, the transistors $T_1$ and $T_2$ are made conductive and non-conductive is synchronism with the transistor T8 as readily apparent from the following disclosure.

The collector of the transistor T7 is at a potential which is substantially equal to that of its emitter when the transistor is conductive, whereas when it is non-conductive, the potential of this collector is more positive. The base of the transistor T9 follows the collector in potential and, according to whether the transistor T7 is conductive or non-conductive, it is negative or positive with reference to the emitter of the transistor T9, since R22 is connected with the negative terminal of S2. Since T9 is of the pnp type, it is conductive and/or non-conductive at the same time as T7.

When T9 is conductive, the potential of its collector is substantially equal to that of its emitter, whereas when, it is non-conductive, the potential is more negative. The potential of the collector of T9 is transmitted through resistance R23 to the bases of the transistors $T_1$ and $T_2$. The resistances R23, R24 and R25 are selected in a manner such that when T9 is conductive, the bases of $T_1$ and $T_2$ may be positive with reference to the emitters of said transistors, which renders transistors T1 and T2 nonconducting, whereas when t9 is non-conductive, the negative voltage of S2 is applied to the voltage divider constituted by R25, R23 and R24, which gives the bases of $T_1$ and T2 a potential which is slightly more negative than that of their emitters, whereby transistors T1 and T2 become conductive.

In brief, the transistors $T_1$ and $T_2$ are conductive or non-conductive at the same time as the transistor T8 of the multivibrator 4 due to the output signal from transistor T8 being amplified by the transistor T9 control $T_1$ and T2.

In the embodiment according to FIG. 5, the same basic circuit elements utilized as in the case just described but the circuit making and breaking element is constituted by at least one semiconductor controlled switch such as those known by the Registered Trade Names Trigistor and Transwitch, and referred to in the drawing as TS. The controlled switch is brought into its conductive condition by a short impulse of a predetermined polarity applied to a special gate or control electrode and into its non-conductive condition by a short pulse of a reversed polarity applied to the same electrode.

In the embodiment considered, the discharge current between the part P and the electrode E is detected by sensing the voltage between the electrode and the part. The control voltage is applied to a potentiometer 7 having a slider to allow adjustment of the level of the input signal into the Schmitt trigger 2. In this case, when discharge commences, the voltage between E and P is reduced suddenly so that the voltage at the input of the Schmitt trigger 2 decreases simultaneously and causes its rocking. The short pulses of either polarity intended for the control of TS are formed respectively by differentiating circuits 16 and 17 fed by the multivibrators 3 and 4. The diodes D3 and D4 allow the passage only of pulses of a predetermined polarity respectively through the resistances R26 and R27.

The short negative pulses supplied by the differentiating circuit 17 at the moment at which the multivibrator 3 rocks back from its non-stable condition in which it remains for a duration Ton into its stable condition, ensures the opening of the discharge circuit through the switch TS, whereas the short positive pulses supplied by the differential circuit 16 at the moment at which the multivibrator 4 rocks back out of its non-stable condition in which it remains for a duration Toff into its stable condition bring the switch TS into its conductive condition.

The diagram of operation is the same as that illustrated in FIGS. 3a to 3f and the elements 2, 3, 4 are identical with those illustrated in FIG. 4. However, in the present case, the passage of the discharge current detected by a lowering in the voltage between the electrode E and the part P locks the input transistor T3 of the Schmitt trigger 2. In this embodiment, the output signal of the Schmitt trigger is thus tapped off the collector of T3 instead of the collector T4 in FIG. 4. Furthermore, the negative pulses applied to TS are obtained through the shunting of a signal tapped off the collector of T6 in FIG. 4. The positive pulses applied to TS are obtained through shunting of a signal tapped off T7 in FIG. 7.

In the third embodiment illustrated in FIG. 6, the main supply of machining current is constituted by a rectifying system fed with three phase current under low voltage through the filtering induction coils limiting the current as shown at LR, LS and LT. The current rectified by the rectifiers 8 to 13 is fed into the machining area which is connected directly across the terminals of the supply. The starting of the discharges is obtained through the agency of an auxiliary supply of voltage S3 at for instance 80V which is higher than the voltage of the arc during the machining the voltage age of supply S3 being applied between the electrode E and the part P when a npn transistor forming a first current breaking and making element $T_{10}$ providing for the starting becomes conductive. The auxiliary discharge current produced by said supply is limited by two resistances R28 and R29. The resistance R29 serves furthermore for supplying a voltage detecting the commencement of the discharge between the electrode E and the part P.

The discharge current is cut off by the setting of the group of transistors $T_{11}$ to $T_{13}$ in their conductive condition to form a second current breaking and making power element which produces a complete shunting of the current fed by the rectifiers 8 to 13 into the machining gap extending between the electrode E and the part P, the shunt forming practically a short circuit in parallel with said gap. During the short circuit produced by the transistors $T_{11}$ to $T_{13}$, the current increases only very slightly by reason of the regulating action of the induction coils LR, LS and LT.

The signal detecting the starting of each discharge is produced by the voltage appearing across the terminals of the resistance R29, which voltage is applied to the Schmitt trigger 2 as in the preceding embodiment. Schmitt trigger 2 is followed by a differentiating system 14 producing short pulses controlling the multivibrator 3. This arrangement is constituted as in the embodiment of FIG. 4 by a condenser, a resistance and a diode (C2, $R_{11}$ and $D_1$ in FIG. 4).

Similarly, the multivibrator 3 is followed by a differentiating circuit 15 supplying short pulses controlling the multivibrator 4. This arrangement is similar to that formed by C4, R16 and D2 in FIG. 4. The output signal of the multivibrator 4 is amplified by the transistor $T_{14}$ and then applied to the base of the transistor $T_{10}$ so as to render it conductive when the multivibrator 4 is in its stable condition and non-conductive when the multivibrator 4 is in its non-stable condition for a duration Toff. The output signal of the multivibrator 3 serves also after amplification by an amplifier 16 for the control of a group of transistors $T_{11}$ to $T_{13}$. This signal controls the non-conductive condition of transistors T11 to T13 when the multivibrator 3 is in its non-stable condition for a duration Ton whereby during this period of non-stability, the main rectified current from the mains may be fed between the electrode E and the part P and is superposed over the auxiliary current supplied by S3.

It should be remarked that the output signal of the amplifier 16 is associated through two resistances R30 and R31 with a voltage biasing the bases of the transitors $T_{11}$ to $T_{13}$ so as to maintain the latter in their conductive condition during the stable condition of the multivibrator 3, this voltage being supplied by an auxiliary supply S4 of about 10 volts.

A supply S5 also of about 10 volts feeds the Schmitt trigger 2, the multivibrators 3 and 4, the amplifier 16 and the transistor $T_{14}$.

In this latter embodiment, it is very important for the opening of the short circuit closed by the transistors $T_{11}$ to $T_{13}$ to be prevented whenever no discharge is initiated between the electrode E and the part P by the supply S3, since there may then be obtained an overvoltage across the terminals of the main supply of the machining current capable of destroying the group of transistors. This objectionable occurrence is automatically avoided through the control of $T_{11}$ to $T_{13}$ by the output signal of the multivibrator 3. Furthermore, the maximum voltage appearing across the emitters and collectors of the transistors $T_{11}$ to $T_{13}$ is limited to the discharge voltage which even transiently is lower than the voltage of the auxiliary initiating supply S3. The power diode D5 prevents the supply S3 from feeding as a short-circuit the groups of transistors $T_{11}$ to $T_{13}$ during the time elapsed between the moment at which $T_{10}$ becomes conductive and the moment at which the discharge is initiated, that is during the delay of an undefined duration referred to at the beginning of the present specification.

Obviously, numerous modifications may be brought to the different embodiments described. In particular. the method forming the object of the invention may be executed by resorting to means different from those described and, for instance, the current making and breaking elements may be replaced by vacuum tubes, gas-filled thyratrons and the like. Similarly, the multivibrators, although they are advantageous from a structural standpoint, may be replaced by any other electric diagram or arrangement operating as a timer, that is any arrangement adapted to supply an output signal after a predetermined time has elapsed after the reception of the input signal.

In view of obtaining perfect constancy of energy for each pulse, it is possible to resort to special multivibrators 3 and 4 in which the duration of the non-stable condition respectively Tp and/or Toff may vary automatically in response to the electrical machining conditions. In particular, it is possible to make Tp vary in a direction opposed to the modifications in the voltage of each discharge and to the modifications in the discharge current in order to maintain at a constant value the energy of the successive discharges with a very high accuracy. The current may also be detected by means of a transformer of which the primary is connected in series in the electrode and part circuit, while its secondary supplies pulses of opposite polarities respectively at the beginning of the establishment of the discharge current and at the moment of the cutting off of said current. Similarly, the RC circuits forming differentiating circuits may be replaced without any difficulty by transformers producing in a conventional manner a pulse for each sudden modification in the current passing through the primary.

I claim:

1. Apparatus for machining a part by elctric discharge comprising an electrode disposed adjacent said part so as to define a gap therebetween, a voltage source, switching means for applying successive voltage pulses to said gap, circuit means connecting said voltage source and said switching means with said electrode and said part, means for sensing the commencement of electric discharge across said gap, and timing means connected with said sensing means and said switching means and responsive to said sensing means to open said switching means to end said electric discharge a predetermined time after commencement of said electric discharge whereby electric discharge is assured with each of said pulses.

2. The invention as recited in claim 1 wherein said timing means includes means for closing said switching means to initiate a succeeding pulse a predetermined time after said switching means is opened.

3. The invention as recited in claim 1 wherein said circuit means includes a resistor connected in series with said switching means and said voltage source, and sensing means includes means for sensing the voltage across said resistor.

4. The invention as recited in claim 1 wherein said timing means includes a first monostable multivibrator having an input connected with said sensing means and an output, end a second monostable multivibrator having an input connected with the output of said first monostable multivibrator and an output connected with said switching means whereby the time delay associated with said first monostable multivibrator defines the duration of the electric discharge associated with each pulse and the time delay associated with said second monostable multivibrator defines the duration between the end of said electric discharge and the initiation of the next succeeding pulse.

5. The invention as recited in claim 1 wherein said switching means includes a semiconductor device having a control electrode connected with said timing means.

6. Apparatus for machining a part by electric discharge comprising an electrode disposed adjacent said part so as to define a gap therebetween; a source of voltage; switching means for periodically applying said voltage to said gap to define a succession of voltage pulses; means for sensing the commencement of electric discharge across said gap; control means for said switching means connected with and responsive to said sensing means and including first timing; means for controlling said switching means so that the duration of the electric discharge associated with each of said voltage pulses is constant and second timing means connected with end responsive to said first timing means for controlling said switching means so that the period between the end of the electric discharge associated with each of said voltage pulses and the initiation of the next succeeding voltage pulse is constant; and means connecting said control means with said switching means.

7. The invention as recited in claim 6 wherein said first timing means includes a first monostable multivibrator having an input connected with said sensing means and an output, and said second timing means includes a second monostable multivibrator having an input connected with the output of said first monostable multivibrator and an output connected with said switching means.

8. The invention as recited in claim 6 wherein said sensing means includes a resistor connected in series with said switching means and said electrode, and means for sensing the voltage across said resistor.

9. the invention as recited in claim 6 wherein said sensing means includes voltage sensing means and a Schmitt trigger connected with and responsive to said voltage sensing means.

10. The invention as recited in claim 6 wherein said switching means includes a semiconductor controlled switch having a control electrode, and said means connecting said control means with said switching means includes first pulse forming means connected with said first timing means and said control electrode to provide pulses to render said semiconductor controlled switch nonconductive and second pulse forming means connected with said second timing means and said control electrode to provide pulses to render said semiconductor controlled switch conductive.

11. The invention as recited in claim 6 wherein said switching means includes a plurality of transistors, each having a base, a collector and an emitter and means connecting said transistors in parallel at their collectors and emitters and connecting their bases together, and said means connecting said control means with said switching means includes pulse means connected with said second timing means and said bases for providing pulses to control the conduction of said plurality of transistors.

12. Apparatus for machining a part by electric discharge comprising an electrode disposed adjacent said part to define a gap therebetween, circuit means connected with said electrode for supplying pulses of electrical energy to cause electric discharge across said gap, means for sensing the commencement of electric discharge across said gap, timing means connecting with and responsive to said sensing means for controlling the duration of the electric discharge associated with each of said pulses and the time duration between successive ones of said pulses, and means connecting said timing means with said circuit means to control the operation thereof.

13. The invention as recited in claim 12 wherein said circuit means includes a first source of electrical energy, first switching means for connecting said first source across said gap, a second source of electrical energy connected across said gap and second switching means connected across said gap for shunting said second source, said timing source, said timing means includes first means connected with said sensing means and having a time delay associated therewith equal to the duration of the electric discharge associated with each of said pulses and second means connected with said first means and having a time delay associated therewith equal to the time duration between successive ones of said pulses, and said means connecting said timing means with said circuit means includes third means connecting said first timing means with said second switching means and fourth means connecting said second timing means with said first switching means.

14. The invention as recited in claim 13 wherein said sensing means includes a resistor, said first means includes a first monostable multivibrator and said second means includes a second monostable multivibrator.

15. In an electrical discharge machine for eroding material from a workpiece by passing successive pulses through an ionizable work gap defined between an electrode tool and the workpiece, a system for supplying said pulses comprising the combination of a first switch means for selectively coupling a source of ionizing potential across said work gap, a second switch means for selectively coupling a source of material eroding energy across said work gap, a detection means coupled across said gap for providing a first output signal when the gap is ionized, and a pulse generating means coupled to said second switch means and responsive to said first output signal from said detection means for actuating said second switch means to couple said source of material eroding energy across said work gap only when said work gap is ionized.

16. The system of claim 15 wherein said pulse generating means includes a monostable pulse generator which is coupled to said second switch means and which is triggered by said first output signal to actuate said second switch means.

17. The system of claim 16 wherein said pulse generating means includes a monostable pulse generator coupled to said second switch means, a bistable circuit means coupled to said first switch means and having a first and second state, first coupling means coupling said detection means to said bistable means for switching said bistable means to said first state and actuating said first switch means in response to said second output signal, second coupling means coupling said monostable pulse generator with said detection means for actuating said second switch means in response to said first output signal, and third coupling means coupling said monostable pulse generator and said bistable means for switching said bistable means to said second state and deactuating said first switch means in response to the actuation of said second switch means.

18. The system of claim 17 wherein said source of ionizing potential has a relatively high voltage, low current characteristic and said source of material eroding energy has a relatively low voltage, high current characteristic.

19. The system of claim 18 wherein said gap has a varying ionization voltage point, said source of ionizing potential provides a voltage which is greater than the ionization voltage point of the gap, and said source of material eroding energy provides a voltage which is lower than the ionization voltage point of the gap.

20. The system of claim 17 further including a gate circuit coupled between said monostable pulse generator and said second switch means, and a reference voltage circuit coupled between said electrode tool and said gate circuit for supplying a signal to inhibit said gate circuit in response to a drop in the voltage across said gap to a point below a predetermined level to thereby deactuate said second switch means in the event of a gap short circuit and the like.

21. The system of claim 15 wherein said detection means further provides a second output signal when the work gap is deionized, and wherein said pulse generating means is coupled to said first switch means and is responsive to said second output signal for actuating said first switch means to couple said source of ionizing potential across the work gap when the work gap is deionized.

22. The system of claim 21 wherein said pulse generating means includes a bistable circuit means connected in actuating relation with said first switch means and having a first state and a second state, said bistable circuit means being coupled to said detection means and being switched to said first state in response to said second output signal for actuating said first switch means and to said second state in response to said first output signal for deactuating said first switch means.

23. The system of claim 21 further including means coupled to at least one of said electrode tool and workpiece and responsive to a drop in the voltage across the gap to a point below a predetermined level to provide an inhibiting signal and gate means coupled between said pulse generating means and said second switch means and responsive to said inhibiting signal for deactuating said second switch means.

24. The system of claim 15 further including means coupled to at least one of said electrode tool and workpiece and responsive to a drop in the voltage across the gap to a point below a predetermined level to provide an inhibiting signal, and gate means coupled between said pulse generating means and said means second switch means and responsive to said inhibiting signal for deactuating said second switch means.

* * * * *

UNITED STATES PATENT OFFICE
CERTIFICATE OF CORRECTION

Patent No. 3,916,138          Dated October 28, 1975

Inventor(s) Jean Pfau

It is certified that error appears in the above-identified patent and that said Letters Patent are hereby corrected as shown below:

Column 1, line 39, "asoribable" should be --ascribable--.

Column 2, line 15, "shown" should be --show--.

Column 2, line 41, after "present" insert --invention--.

Column 3, line 59, "how" should be --now--.

Column 5, line 10, "form" should be --from--.

Column 5, line 17, following "which" insert --is--.

Column 5, line 48, before "example" insert --for--.

Column 8, line 22, delete "age".

Column 10, line 29, "end" should be --and--.

Column 10, line 55, "end" should be --and--.

Signed and Sealed this

*third* Day of *February 1976*

[SEAL]

Attest:

RUTH C. MASON
*Attesting Officer*

C. MARSHALL DANN
*Commissioner of Patents and Trademarks*